May 15, 1951     H. T. KELSH     2,552,975
PHOTOGRAMMETRIC PROJECTION MACHINE
Filed April 13, 1949     3 Sheets-Sheet 1

INVENTOR.
Harry T. Kelsh.
BY
ATTORNEY

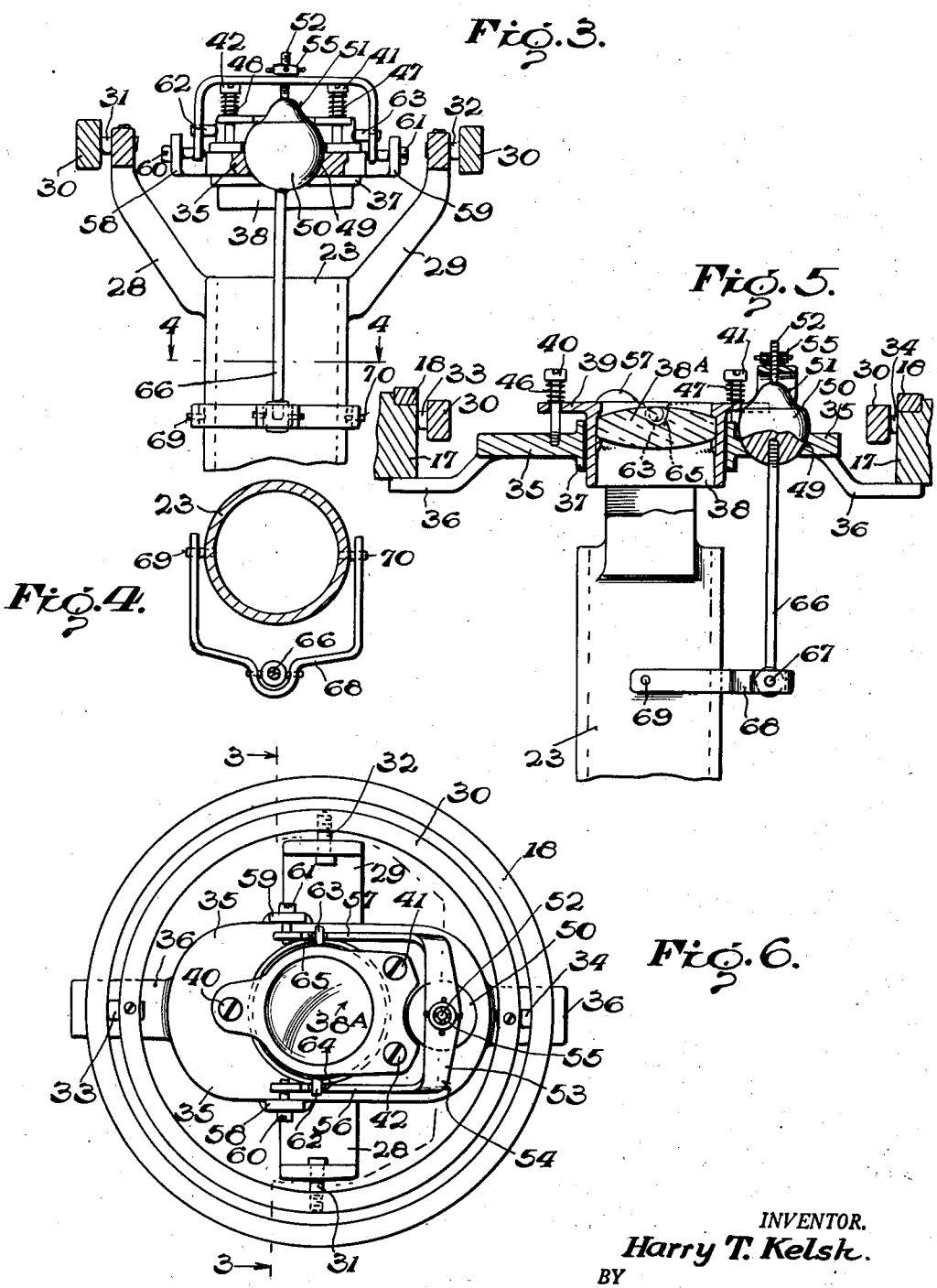

Patented May 15, 1951

2,552,975

UNITED STATES PATENT OFFICE 2,552,975

PHOTOGRAMMETRIC PROJECTION MACHINE

Harry T. Kelsh, Washington, D. C.

Application April 13, 1949, Serial No. 87,298

10 Claims. (Cl. 88—24)

This invention relates to photogrammetric devices, and is more particularly concerned with an apparatus or machine which is used to project stereoscopic pairs of diapositives taken by an aerial camera for the purpose of making planimetric and topographic maps.

It is generally understood in this art, that the lenses employed in such cameras and in the lenses of stereoscopic projectors, have certain imperfections which produce distortion in the projected image. These distortions vary with each lens. Although attempts have been made by the manufacturer of such lenses, such as the metrogon lenses, it has not been possible, heretofore to produce a perfect lens or one which has no distortion characteristics. The distortion may result in certain areas of the projected image having their elements spaced apart to a greater relative extent than the natural objects photographed. Other distortions may result in other areas of a photograph having their elements spaced too closely together. Both types of distortion may exist in a single lens, and no satisfactory method of compensating for such distortions has yet been found.

It is an object of this invention to provide a projection machine of the type mentioned, wherein certain distortions, referred to generally as radial distortions as distinguished from tangential distortions, in the diapositives produced by the lens are automatically compensated.

My invention is described hereinafter in combination with the type of projecting apparatus disclosed in my co-pending application for patent, Serial No. 3,263, filed January 20, 1948, now Patent No. 2,492,870, dated December 27, 1949, and comprises certain improvements therein, hereinafter more fully explained.

In the accompanying drawing there is illustrated an embodiment of my invention in which:

Figure 3 is a side elevational view of the lens moving linkage.

Figure 4 is a section along the line 4—4 of Figure 3.

Figure 5 is a side elevational view of the mechanism shown in Figure 3.

Figure 6 is a plan view of the mechanism of Figures 3 and 5.

Figure 1:
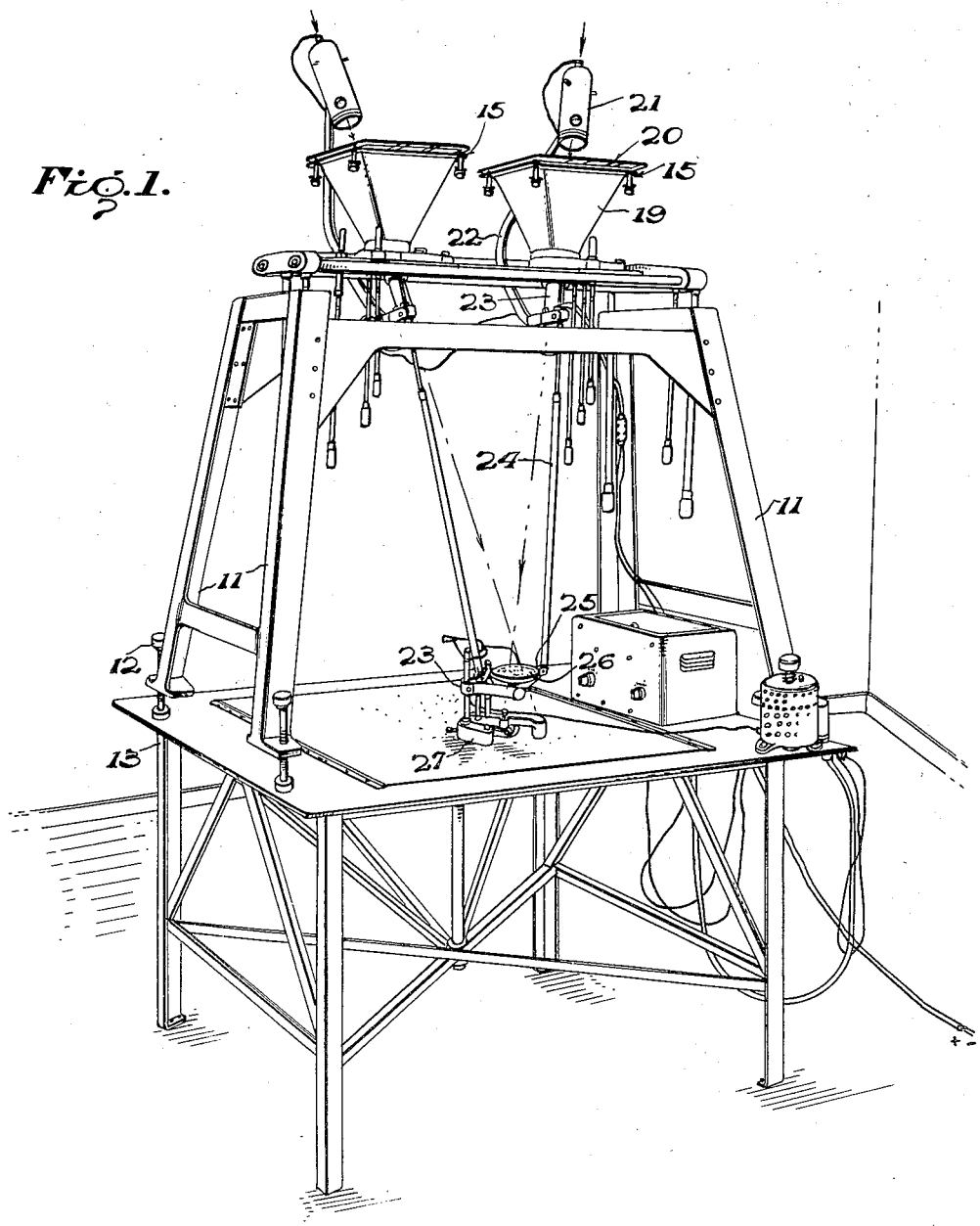
Figure 1 is an isometric view of the whole machine.
Figure 2:
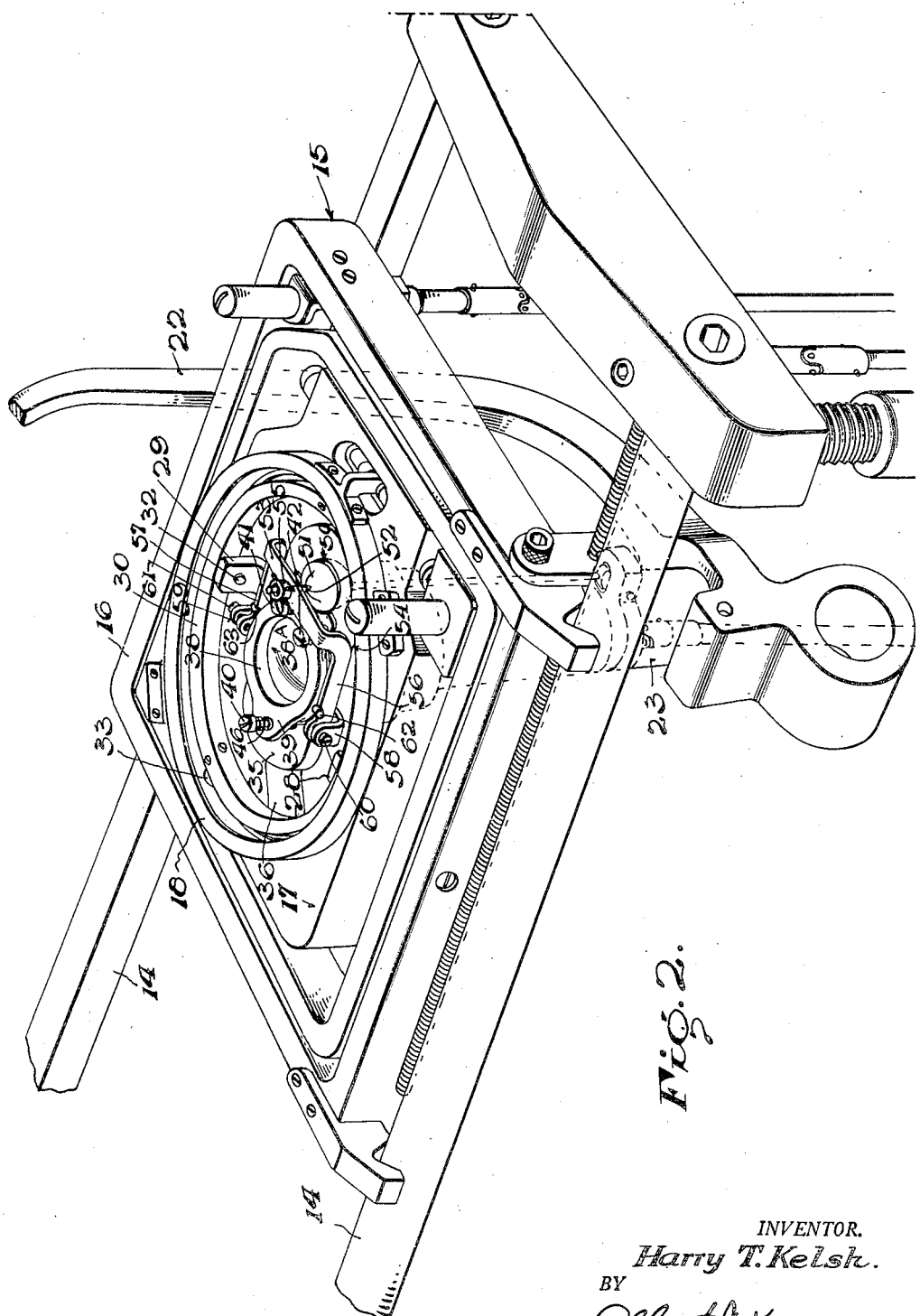
Figure 2 is an isometric view of one of the lens mounts of the machine.

Referring with more particularity to the drawing, in which like numerals designate like parts, the embodiment illustrated comprises, in general, a suitable frame structure 11 which is mounted on adjustable legs 12, and supported on a table 13 or other suitable horizontal support. At the top of the frame 11, there are mounted tracks 14, which carry a pair of optical projection units indicated generally at 15.

Each projection unit includes a base member 16 and an inner adjustable block 17 containing an annular rotatable flange 18 recessed in its top, which receives the lower end of a hood-like member 19 in the form of a hollow inverted truncated pyramid. The top of the member 19 is adapted to carry the diapositive 20 whose images are to be projected. A projector 21 of a narrow cone of light rays, is movably mounted above the diapositive 20 on the upper end of a gooseneck arm 22. The lower end of the gooseneck arm extends around the member 19 and is secured beneath it to a tubular member 23, axially aligned with the projector 21 and the node or nodal region of the lens of the unit hereinafter more fully described.

The member 23 is secured to the upper end of a telescopable arm 24. The lower end of arm 24 is secured by universal joint 25 to one side of the platen 26 of a tracing or mapping table 27 of the type usually employed in projection plotters, details of which are fully disclosed in said copending application. The purpose is to maintain the point sources of light in a converging relationship relative to platen 26 to insure always a proper stereoscopic projection and limit the light projection through the diapositives 20 to about the area of the platen. This permits concentration of light at the particular area being mapped. Also, the movements of each light projector 21 is constrained to positions substantially equidistant from the nodal region of the lens system of its corresponding projection unit.

The member 23 is supported for universal movement by being secured to the lower end of yoke arms 28 and 29, the upper ends of which are pivoted to a gimbal ring 30 by means of pins 31 and 32. The gimbal ring is, in turn, pivotally supported on the block 17 by means of pins 33 and 34.

Above the member 23 is disposed a bridge member 35, the ends of which are secured to the block 17 by arms 36. The bridge 35 is provided with a vertical flanged aperture 37 aligned with the axis of the member 23. Within the aperture 37 there is slidably mounted in a vertical direction a tubular lens barrel 38, carrying a lens system 38A, and having at its upper end an outward horizontal flange 39. A plurality of vertical pins 40, 41 and 42 are slidably mounted through the flange 39 in spaced relation equidistantly from the center of the barrel 38. The lower ends of the said pins are rigidly secured to the bridge member 35 by any suitable means such as threads, soldering or any other means. The pins 40, 41 and 42 are provided with heads 43, 44, and 45 at their upper ends and compression springs 46, 47, and 48 are disposed between said heads, respectively, and the upper surface of the flange 39 so as to urge the lens barrel 38 downwardly in the aperture 37.

On one side of the aperture 37 there is provided through the bridge member 35 an annular seat 49 having a spherical segment surface diverging upwardly and which is adapted to support a ball member 50. The lower surface of the ball member 50 is spherical and free to move on the seat 49. The upper end of the ball 50 is provided with a special contour or cam surface 51 hereinafter more fully explained. A cam follower 52 in the form of a vertical pin having a ball point at its lower end engages the top of the ball member 50 substantially as shown. Said follower 52 is secured to the web 53 of a U-shaped member 54 by means of a lateral displacement spider 55. The parallel arms 56 and 57 of the member 54 are pivoted at the opposite end to posts 58 and 59 by means of pins 60 and 61, said posts being secured to the bridge member 35.

Projecting outwardly from the lens barrel 38 across a diameter parallel to the axis of the pins 60 and 61, are pins 62 and 63, which rest in notches 64 and 65 in the arms 56 and 57. By these means, the springs 46, 47 and 48 hold the ball point of the follower 52 in constant engagement with the ball member 50. As the ball member moves, depending upon the contour of its upper portion 51, the ball point rises and falls and causes the lens barrel 38 also to rise and fall a corresponding distance as determined by the leverage of the U-shaped member 54.

The ball member 50 is moved by means of a depending arm or rod 66 having one end secured to the bottom thereof and the other end of the rod pin-connected at 67 to the outer end of a yoke 68. The arms of the yoke member straddle the tube 23 and are pivoted to the tube by means of pins 69 and 70 across a diameter of the tube 23 parallel to the axis of the pins 31 and 32.

In operation, as the mapping table 27 is moved about the mapping surface of the table 13, the tubular members 23 are moved in coordination by the rods 24 and carry the light projectors 21 with them. The movement of the tubes 23 causes the ball member 50 to rock or tilt in its seat 49 and to move in angular relation corresponding to the movement of the tubes 23 due to the parallel linkage defined by the rod 66, yoke 68, tubes 23 and bridge 35. The contour of the upper surface of the ball 50 is so designed as to move the follower 52 and hence the lens barrel 38, so as to compensate for the distortional errors of the lens of the camera from which the diapositives were made. The radial distortion characteristics of the lens of the camera and/or the projection lenses are first determined by known methods. The results are tabulated for all angles as horizontal displacement from the center or vertical axis of the lens. This horizontal displacement, for example, in the usual wide angle aerial lens increases on the aerial negative from zero to approximately 0.12 millimeters at about 30° to 35° from the central axis. It then falls off rapidly to zero at 42° and minus 0.15 millimeter at 45°. This distortion can be compensated if the lens is moved vertically in an amount equal to the horizontal displacement error of any given image point multiplied by the cotangent of the angle between the vertical axis of the lens and a line passing through the nodal point of the lens and the image point on the diapositive. When the displacement error is outward, the lens is moved downward to increase the distances between the diapositive and the lens and vice versa.

I claim:

1. In a stereoscopic projection apparatus, a projection unit having a diapositive mount, a movable light beam projector, means for moving said projector relative to the diapositive, a projection lens mounted for vertical movement, a linkage system connecting said projector to said lens, said system including a ball cam, a socket for tiltably supporting said cam, links connecting said cam to said projector, a pivoted lever connected to said lens, and a cam follower carried by said lever and slidably engaging said ball cam.

2. In a steroscopic projection apparatus, a projection unit having a diapositive mount, a movable light beam projector, means for moving said projector relative to the diapositive, a projection lens mounted for vertical movement, a linkage system connecting said projector to said lens, said system including a ball cam, a socket for tiltably supporting said cam, links connecting said cam to said projector, a pivoted lever connected to said lens, a cam follower carried by said lever and means for urging said cam follower in contact with said cam.

3. In a stereoscopic projection apparatus, a projection unit having a diapositive mount, a movable light beam projector, means for moving said projector relative to the diapositive, a projection lens mounted for vertical movement, a linkage system connecting said projector to said lens, said system including a ball cam, a socket for tiltably supporting said cam, links connecting said cam to said projector, a pivoted lever connected to said lens, and a cam follower carried by said lever, means for urging said cam follower in contact with said cam, and means for adjusting the position of said cam follower on said cam.

4. In a stereoscopic projection apparatus, a pair of projector units having each a diapositive mount and a movable light beam projector, a horizontally movable tracing table having a platen vertically movable thereon, means connecting said platen to said light projectors so as to direct the light therefrom in a convergent relationship on said platen, a projection lens mounted for vertical movement between said platen and each light projector, and a linkage system for moving each of said lenses predetermined vertical amounts when said table moves from one horizontal position to another and when said platen moves from one vertical position to another.

5. A device as defined by claim 4 in which the light projector of each projection unit is disposed so as to project a beam of light through the nodal region of the lens of its corresponding unit.

6. In a stereoscopic projection apparatus, a projection unit having a diapositive support, a movable light beam projector on one side and a projector lens on the other side of said support, said lens being mounted for movement to and from said support, means for constraining the movement of said light beam projector so that for different positions thereof its line of projection will pass through the projection lens and through different portions of a diapositive on said support, and a mechanical linkage connecting said lens to said projector to cause said lens to move to and from the support in relation to the movements of the light beam projector in an amount to substantially compensate for radial distortion in a diapositive image projected through the lens.

7. A device as defined by claim 6 in which the mechanical linkage system includes a cam and a cam follower.

8. A structure as defined by claim 7 having yieldable means for urging the cam follower in contact with the cam.

9. A device as defined by claim 6 in which the mechanical linkage system includes a cam connected to the projector and a cam follower connected to the lens.

10. In a stereoscopic projector apparatus having a pair of projection units, each unit having a diapositive support, a movable light beam projector on one side and a projection lens on the other side of said support, said lens being mounted for movement to and from its corresponding diapositive support, a movable mapping table having a projector screen, a linkage system connecting said table to said projectors to constrain the movements of the table so that the projectors will each swing in an arc about its corresponding projector lens and light from each projector will pass through its corresponding lens onto said screen, and means for moving each projector lens to and from its corresponding diapositive support a distance to substantially compensate for radial distortion in images projected through the lens.

HARRY T. KELSH.

REFERENCES CITED

The following references are of record in the file of this patent:

UNITED STATES PATENTS

| Number | Name | Date |
|---|---|---|
| 1,247,402 | Hopkins | Nov. 20, 1917 |
| 1,655,306 | Barr et al. | Jan. 3, 1928 |
| 1,713,498 | Cooke | May 14, 1929 |
| 1,980,981 | Cooke | Nov. 20, 1934 |
| 2,085,498 | Horner | June 29, 1937 |
| 2,123,510 | Leitz et al. | July 12, 1938 |
| 2,200,594 | Diggins | May 14, 1940 |
| 2,451,031 | Kelsh | Oct. 12, 1948 |